US012566280B2

(12) United States Patent
Wen

(10) Patent No.: US 12,566,280 B2
(45) Date of Patent: Mar. 3, 2026

(54) REVERSING DETECTION FOR AN ELEVATOR CAR DOOR

(71) Applicant: CEDES AG, Landquart (CH)

(72) Inventor: Jianyong Wen, Sargans (CH)

(73) Assignee: Cedes AG, Landquart (CH)

( * ) Notice: Subject to any disclaimer, the term of this patent is extended or adjusted under 35 U.S.C. 154(b) by 179 days.

(21) Appl. No.: 18/454,956

(22) Filed: Aug. 24, 2023

(65) Prior Publication Data

US 2024/0077640 A1     Mar. 7, 2024

(30) Foreign Application Priority Data

Sep. 1, 2022    (EP) ..................................... 22193528

(51) Int. Cl.
  G01V 8/20       (2006.01)
  B66B 13/26      (2006.01)
  E05F 15/43      (2015.01)

(52) U.S. Cl.
  CPC ................ G01V 8/20 (2013.01); B66B 13/26 (2013.01); E05F 15/43 (2015.01); E05F 2015/436 (2015.01); E05Y 2900/104 (2013.01)

(58) Field of Classification Search
  CPC ..... G01V 8/20; E05B 17/22; E05B 47/00461; E06B 9/68; E06B 9/88; E05F 15/43; F16P 3/144
  See application file for complete search history.

(56) References Cited

U.S. PATENT DOCUMENTS

| 8,436,290 B2 | 5/2013 | Klingelhöfer | |
| 8,445,833 B2 | 5/2013 | Klingelhöfer | |
| 2021/0095511 A1* | 4/2021 | Lilienthal | ............... E05F 15/40 |

FOREIGN PATENT DOCUMENTS

| EP | 2 362 242 A1 | 8/2011 |
| EP | 2 362 243 A1 | 8/2011 |
| EP | 3 239 744 A1 | 11/2017 |

OTHER PUBLICATIONS

European Search Report (Application No. 22 193 528.1) dated Feb. 6, 2023 (8 pages).

* cited by examiner

*Primary Examiner* — Said Bouziane
(74) *Attorney, Agent, or Firm* — BURR PATENT LAW, PLLC

(57)     ABSTRACT

A light grid for mounting on an elevator car door for object detection and for determining periodic door movements, including transmitter elements that emits radiation with a specific intensity, receiver elements for receiving the radiation from an assigned transmitter element, and a control device for evaluating the receiver elements in regard to interruption of the radiation coming from an assigned transmitter element and for outputting a signal for object recognition upon interruption. At least one receiver element is configured to output an intensity value for the received radiation. The control device evaluates the intensity value and distinguishes separate high, medium and low intensity value ranges with high, medium and low intensity values, and performs an alternation phase with at least one alternating from the low via the medium to the low intensity value range and to output a signal in the event of an alternation phase having been recognized.

7 Claims, 4 Drawing Sheets

REVERSING DETECTION FOR AN ELEVATOR CAR DOOR

This application claims the benefit under 35 USC § 119(a)-(d) of European Application No. 22 193 528.1 filed Sep. 1, 2022, the entirety of which is incorporated herein by reference.

FIELD OF THE INVENTION

The present invention relates to a light grid for mounting on a sliding door, in particular, an elevator car door.

BACKGROUND OF THE INVENTION

The prior art discloses light grids of the aforementioned type which are configured for detecting objects between the transmitter strip and the receiver strip.

SUMMARY OF THE INVENTION

It is an object of the present invention to provide an improved light grid.

The light grid according to the present invention is a light grid for mounting on a sliding door, in particular, an elevator car door, for object detection and for determining periodic door movements, comprising at least one transmitter element on a transmitter strip, which emit radiation with a specific intensity, comprising at least one receiver element on a receiver strip, which receive the radiation of an assigned transmitter element, and comprising a control device for evaluating the receiver elements in regard to interruption of the radiation coming from an assigned transmitter element and for outputting a signal for object recognition upon interruption, wherein at least one receiver element is configured to output an intensity value for the received radiation, and the control device is configured to evaluate the intensity value and to distinguish separate high, medium and low intensity value ranges with high, medium and low intensity values, the transition between low and medium intensity ranges being defined by a predetermined first limit value and the transition between medium and high intensity ranges being defined by a predetermined second limit value, and to recognize an alternation phase with at least one alternating from the low via the medium to the low intensity value range and to output a signal in the event of an alternation phase having been recognized.

This can afford the advantage that reversing of the sliding door is recognized. This can afford the advantage that a defective sliding door is recognized. This can afford the advantage that a dirty sliding door is recognized.

The control device can also extend to outside the light grid and perform, for instance, the evaluation and the outputting of the signal after data transfer also on an external server.

Preferably, the control device is configured to the effect that the alternation phase has at least one direct alternation from the low via the medium to the low intensity range without an intervening intensity value from the high intensity value range, and/or for the alternation phase a maximum permissible alternation phase duration is defined up until which it is regarded as an alternation phase, and/or the alternation phase has a plurality of alternations, in particular, at least three alternations, from the low via the medium to the low intensity value range, and/or the alternation phase has a plurality of periodic alternations from the low via the medium to the low intensity value range, and/or the periodic alternations directly succeed one another, and/or for periodic alternations a maximum alternation phase period duration is defined up until which periodic alternations are regarded as an alternation phase.

This can afford the advantage that a reversing and/or defective and/or dirty sliding door is recognized particularly precisely.

Preferably, the control device is configured to the effect that the signal includes the number of periodic alternations and/or the signal includes the duration of the periodic alternations.

This can afford the advantage that a particularly detailed evaluation of the door state can be effected.

Preferably, the control device is configured to the effect that the high intensity value range corresponds to the range of low distance, in particular, of a closed or slightly open elevator car door, the medium intensity value range corresponds to the range of medium distance, in particular, of a partly open elevator car door, the low intensity value range corresponds to the range of high distance, in particular, of a wide open or fully open elevator car door, and the ranges of low, medium and high distance separately succeed one another, in particular, directly succeed one another.

This can afford the advantage that a particularly defined evaluation can be effected.

Preferably, the light grid has a device for wirelessly transferring the signal.

This can afford the advantage that it is possible to perform the reception of the signal or the evaluation and the outputting of the signal after data transfer also on an external server.

Preferably, the transmitter strip and/or the receiver strip are/is provided for mounting on a sliding door, in particular an elevator car door.

This can afford the advantage that facilitated mounting is possible.

The sliding door, in particular elevator car door, according to the present invention is a sliding door, in particular, elevator car door, comprising a light grid according to the present invention as described above. In this case, the transmitter strip and/or the receiver strip are/is secured to a door leaf.

This can afford the advantages mentioned above.

The elevator according to the present invention is an elevator comprising a light grid according to the invention as described above.

This can afford the advantages mentioned above.

Further features of the present invention are specified in the drawings.

The advantages mentioned in each case can also be realized for combinations of features in the context of which they are not mentioned.

BRIEF DESCRIPTION OF THE DRAWINGS

Exemplary embodiments of the present invention are illustrated in the drawings and are explained in greater detail below. In this case, identical reference signs in the individual figures designate elements that correspond to one another.

DETAILED DESCRIPTION OF THE INVENTION

Figure 1:
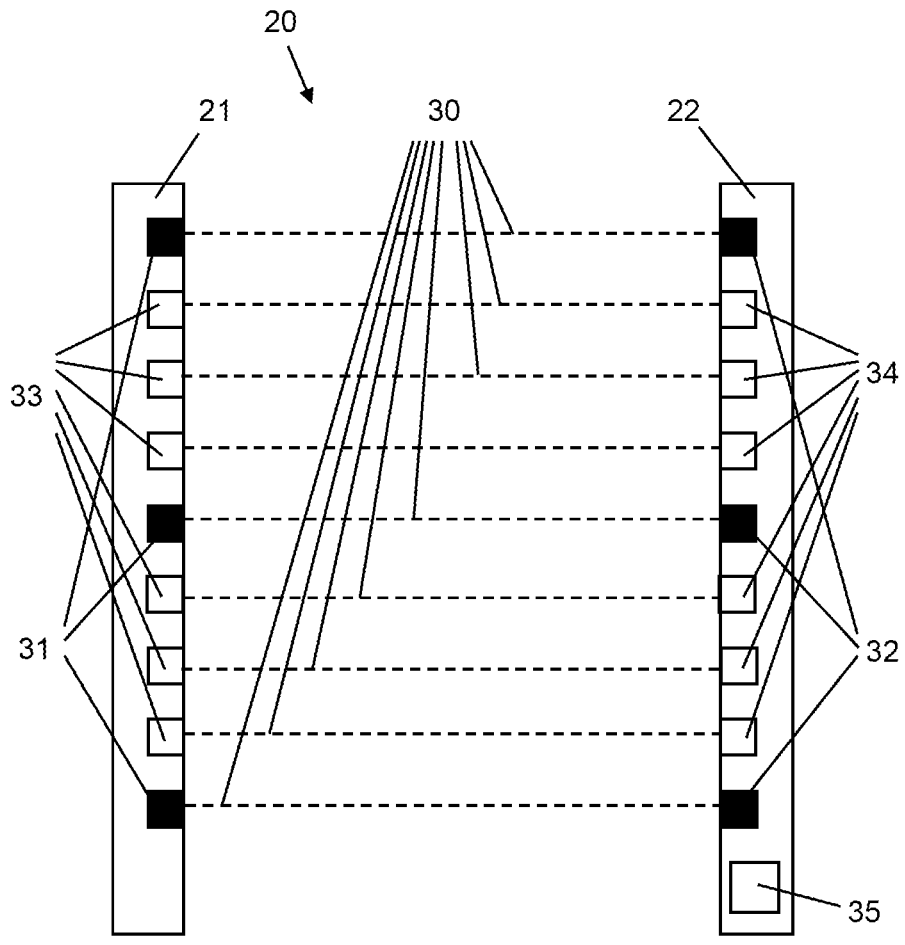
FIG. 1 shows a light grid.

FIG. 1 shows a light grid 20 according to the present invention comprising the transmitter strip 21 and the receiver strip 22. The transmitter strip 21 has three qualified transmitter elements 31 and further non-qualified transmitter elements 33. The qualified transmitter elements 31 can emit IR radiation with a specific intensity. The receiver strip 22 has three qualified receiver elements 32 and further non-qualified receiver elements 34. The qualified receiver elements 32 can output intensity values for the intensity of the received radiation. Transmitter strip and receiver strip are each arranged vertically and parallel to one another and opposite one another at the same height. The transmitter elements and the receiver elements form light beams 30. Upon the interruption of a light beam, the receiver strip outputs a signal for the interruption. Each qualified transmitter element 31 is assigned a qualified receiver element 32 at the same height and these together form a horizontal transmission beam 30. The light grid 20 additionally has a control device 35.

Figures 2A, 2B, 2C:
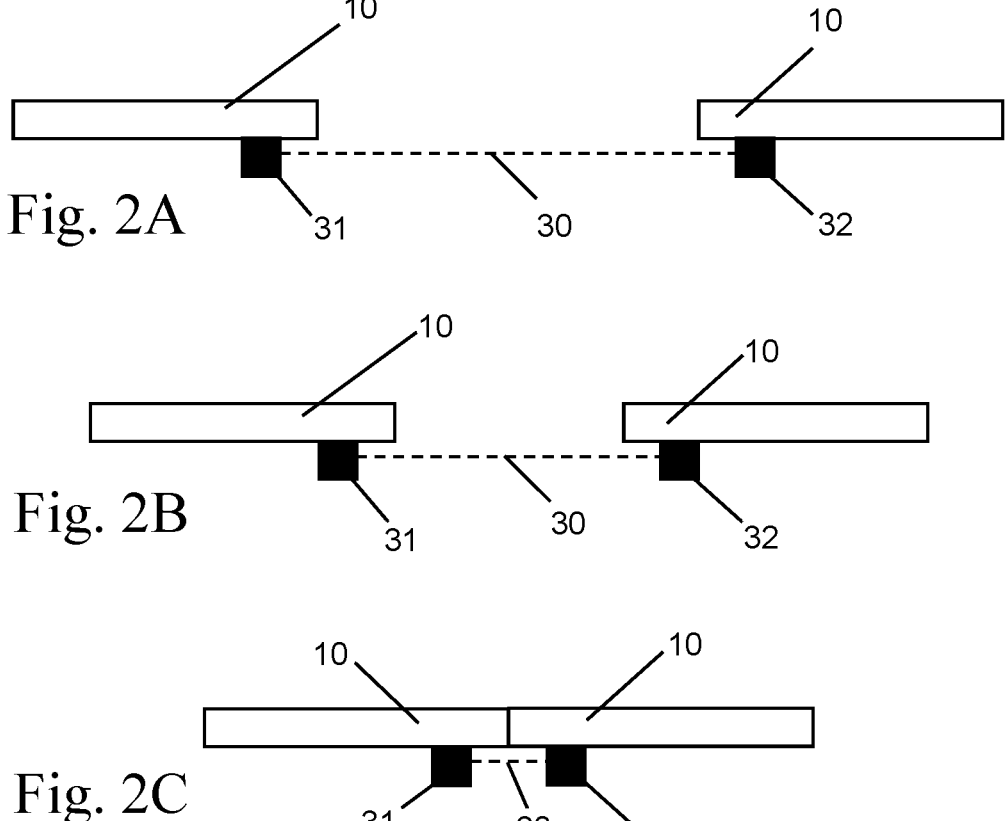
FIG. 2A shows an open double sliding door of an elevator car.
FIG. 2B shows a half-open double sliding door of an elevator car.
FIG. 2C shows a closed double sliding door of an elevator car.

FIGS. 2A to 2C show the light grid 20 from FIG. 1 on a double sliding door 10 of an elevator car. The transmitter strip comprising the transmitter elements 31 is secured to one leaf of the double sliding door, and the receiver strip comprising the transmitter elements 32 is secured to the opposite leaf of the double sliding door. The rest of the arrangement is as in FIG. 1. Transmitter strip and receiver strip move concomitantly with the double sliding doors and in the process remain arranged parallel and at the same height with respect to one another, such that the light beams remain horizontal and assigned to the corresponding qualified transmitter and receiver elements. They decrease their distance together with the elevator car doors when the elevator car doors close, and they increase their distance together with the elevator car doors when the elevator car doors open. The distance between the transmitter and receiver strips corresponds to the distance between the two leaves of the double sliding door apart from a constant factor. FIG. 2A shows the open door. FIG. 2B shows the half-closed door. FIG. 2C shows the closed door.

Figure 3A:
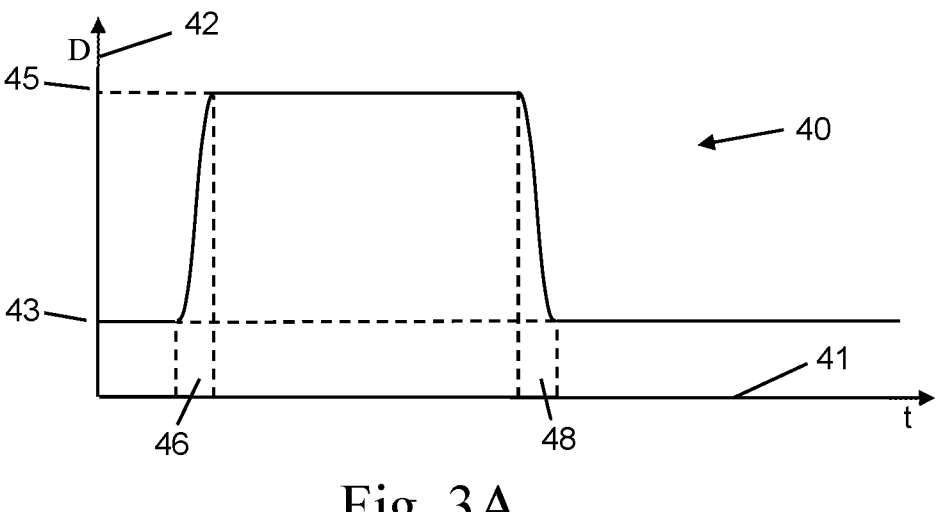
FIG. 3A shows a distance curve of a normally closing sliding door.

FIG. 3A shows a diagram 40 for the distance between transmitter strip and receiver strip as a function of time for a normally opening and once again closing elevator car door in accordance with FIGS. 2A to 2C.

The X-axis 41 shows the time progression. The Y-axis 42 shows the distance between transmitter strip and receiver strip. The minimum distance 43 is the distance between transmitter strip and receiver strip with the elevator car door closed. The maximum distance 45 is the distance between transmitter strip and receiver strip with the elevator car door fully open. Proceeding from the left, the curved profile shows the closed elevator car door, then the process of door opening 46, then any time when the elevator car door is fully open with maximum distance 45, then the process of door closing 48, and finally the state of the closed elevator car door with once again the minimum distance 43.

Figure 3B:
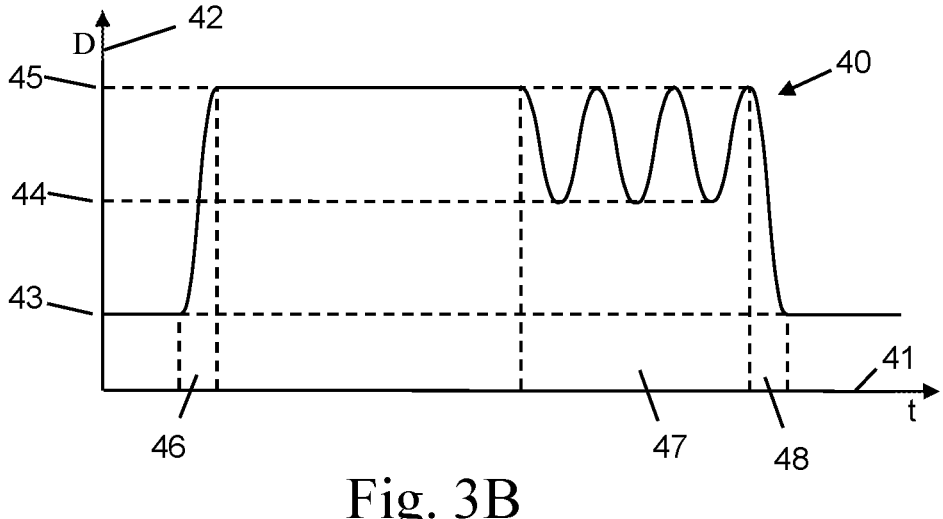
FIG. 3B shows a distance curve of a sliding door closing in a reversing fashion.

FIG. 3B shows a diagram 40 in accordance with FIG. 3A, but with door reversings 47 before the process of door closing 48.

The left beginning of the door reversings 47 is originally the beginning of a closing process. However, the elevator car door experiences a resistance shortly after this original beginning of a closing process and reopens in accordance with the customary setting of the door control. In the diagram shown, this reversing is repeated three times until, upon the renewed, now successful attempt at door closing 48, the resistance could be overcome and the elevator car door actually closes and is closed with minimum distance 43. The resistance may have been caused for instance by a dirty guide strip or a small stone in the guide strip.

During the three door reversings 47, the elevator car door partly closes and fully opens again three times. Accordingly, the distance between transmitter strip and receiver strip fluctuates between the maximum distance 45 and a medium distance 44 during the door reversings 47.

Figure 4A:
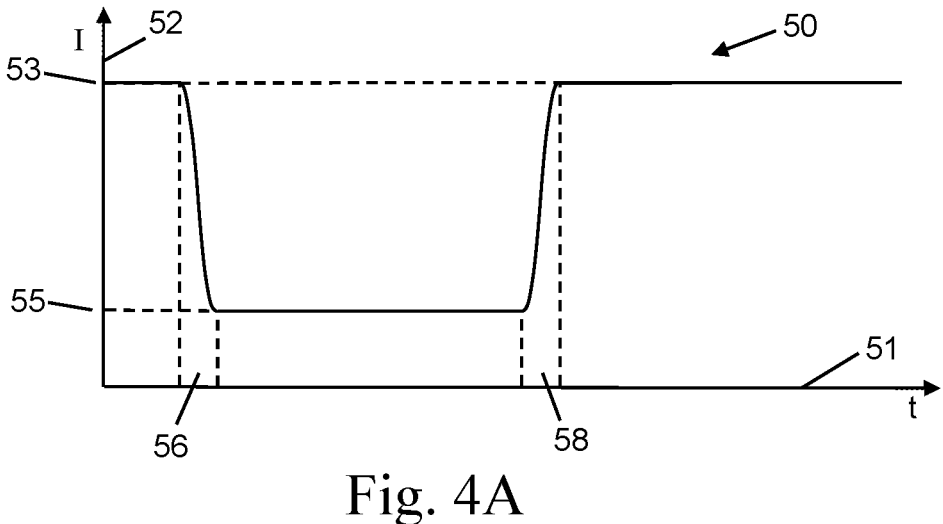
FIG. 4A shows an intensity curve of a normally closing sliding door.

FIG. 4A shows a diagram for the intensity value received by the qualified receiver elements of the receiver strip as a function of time for a normally opening and once again closing elevator car door in accordance with FIG. 3A.

The X-axis 51 shows the time progression. The Y-axis 52 shows the intensity received by the qualified receiver elements.

The maximum intensity 53 corresponds to the distance between transmitter strip and receiver strip with the elevator car door closed. The minimum intensity 55 corresponds to the distance between transmitter strip and receiver strip with the elevator car door fully open. Proceeding from the left, the curve profile shows the closed elevator car door with maximum intensity 53, then the process of door opening 56 with a decrease in the intensity, then a time when the elevator car door is fully open with minimum intensity 55, then the process of door closing 58 with intensity rising again, and finally the state of the closed elevator car door with once again maximum intensity.

Figure 4B:
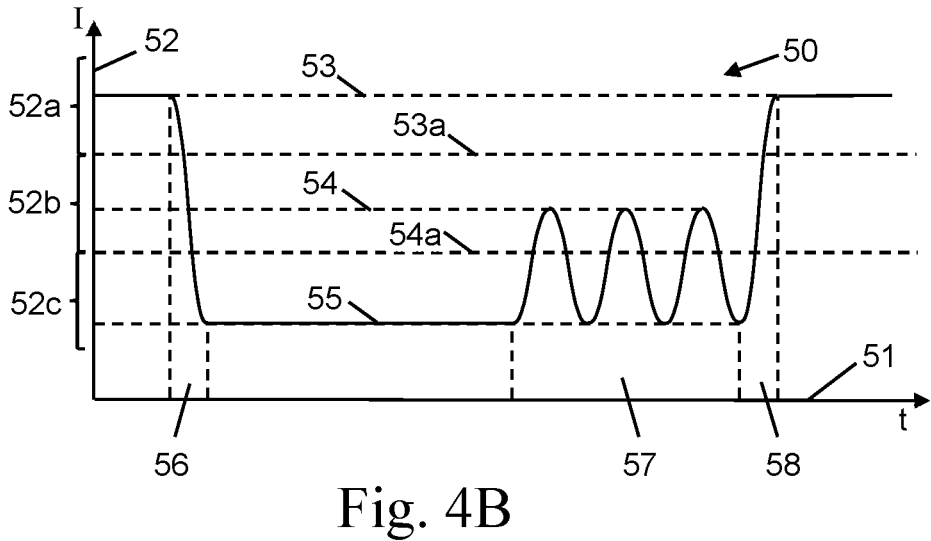
FIG. 4B shows an intensity curve of a sliding door closing in a reversing fashion.

FIG. 4B shows a diagram 40 in accordance with FIG. 4A, but with door reversings 57 before the process of door closing 58 in accordance with FIG. 3B.

During the three door reversings 57, the intensity fluctuates between minimum intensity 55 for the fully open elevator car door and a medium intensity 54 for the partly open elevator car door.

It is evident that the minimum intensity 55 of revisions of the abovementioned type remains in a range of low intensity 52c and the medium intensity 54 of revisions of this type remains in a range of medium intensity 52b, without reaching the range of high intensity. The transition between the range of low intensity and the range of medium intensity is defined by a predetermined first limit value 54a. The transition between the range of medium intensity and the range of high intensity is defined by a predetermined second limit value 53a.

Accordingly, the intensity of revisions of the abovementioned type fluctuates between the adjacent ranges of low intensity 52c and medium intensity 52b, without reaching the adjacent range of high intensity 52a.

The control device 35 monitors the profile of the intensity and emits a signal for multiple door reversing if the intensity alternates six times directly between the range of low intensity 52c and the range of medium intensity.

LIST OF REFERENCE SIGNS

10 Car door
20 Light grid

21 Transmitter strip
22 Receiver strip
30 Light beams
31 Qualified transmitter elements
32 Qualified receiver elements
33 Simple transmitter elements
34 Simple receiver elements
35 Control device
40 Distance curve
41 Time axis
42 Distance axis
43 Minimum distance
44 Medium distance
45 Maximum distance
46 Door opening
47 Door reversing s
48 Door closing
50 Intensity curve
51 Time axis
52 Intensity axis
52*a* Range of high intensity
52*b* Range of medium intensity
52*c* Range of lower intensity
53 Maximum intensity
53*a* Limit value
54 Medium intensity
54*a* Limit value
55 Minimum intensity
56 Door opening
57 Door reversing s
58 Door closing

The invention claimed is:

1. A light grid for mounting on a sliding door of an elevator car door, for object detection and for determining periodic elevator car door movements, comprising:

at least one transmitter element on a transmitter strip, which emits radiation with a specific intensity, at least one receiver element on a receiver strip, which receives the radiation of an assigned transmitter element, and a control device for evaluating the at least one receiver element in regard to interruption of the radiation coming from an assigned transmitter element and for outputting a signal for object recognition upon interruption, wherein at least one receiver element is configured to output an intensity value for the intensity of the received radiation, and the control device is configured to evaluate the intensity value and to distinguish separate high, medium and low intensity value ranges with high, medium and low intensity values, with the transition between low and medium intensity ranges being defined by a predetermined first limit value and the transition between medium and high intensity ranges being defined by a predetermined second limit value, and to recognize an alternation phase with at least one alternating from the low via the medium to the low intensity value range and to output a signal in the event of an alternation phase having been recognized, and wherein the control device is configured to assign the high intensity value range to the range of low distance associated with a closed or slightly open elevator car door, to assign the medium intensity value range to the range of medium distance associated with a partly open elevator car door, and to assign the low intensity value range to the range of high distance associated with a wide open or fully open elevator car door, and the ranges of low, medium and high distance separately and directly succeed one another.

2. The light grid according to claim 1, wherein the control device is further configured for the alternation phase with at least one direct alternation from the low via the medium to the low intensity range without an intervening intensity value from the high intensity value range, and/or for the alternation phase a maximum permissible alternation phase duration is defined up until which it is regarded as an alternation phase, and/or for the alternation phase with at least three alternations, from the low via the medium to the low intensity value range, and/or for the alternation phase with a plurality of periodic alternations from the low via the medium to the low intensity value range, and/or for the periodic alternations to directly succeed one another, and/or for periodic alternations, a maximum alternation phase period duration being defined up until which periodic alternations are regarded as an alternation phase.

3. The light grid according to claim 1, wherein the control device is further configured such that the signal includes the number of periodic alternations and/or the signal includes the duration of the periodic alternations.

4. The light grid according to claim 1, wherein the light grid includes a device for wirelessly transferring the signal.

5. The light grid according to claim 1, wherein the transmitter strip and/or the receiver strip are/is the sliding door of the elevator car door.

6. A sliding door of an elevator car door, comprising the light grid according to claim 1.

7. An elevator comprising the light grid according to claim 1, wherein the transmitter strip and/or the receiver strip are/is secured to the elevator car door.

* * * * *